United States Patent [19]

Umezawa et al.

[11] 3,928,569

[45] Dec. 23, 1975

[54] TWO SUBSTANCES INHIBITING BETA-LACTAMASE AND THEIR PRODUCTION

[75] Inventors: Hamao Umezawa, Tokyo; Susumu Mitsuhashi, Musashino; Ryozo Utahara, Tokyo; Tetsuo Ishikawa, Yokohama, all of Japan

[73] Assignee: Zaidan Hojin Biseibutsu Kagaku Kenkyu Kai, Tokyo, Japan

[22] Filed: Aug. 2, 1973

[21] Appl. No.: 385,057

[30] Foreign Application Priority Data

Aug. 9, 1972 Japan.............................. 47-79086
May 21, 1973 Japan.............................. 48-55721

[52] U.S. Cl.................................. 424/117; 195/80
[51] Int. Cl.².......................................... A61K 35/00
[58] Field of Search........................ 424/117; 195/80

[56] References Cited

UNITED STATES PATENTS

| 3,495,003 | 2/1970 | Hausmann et al. ................. 424/117 |
| 3,592,925 | 7/1971 | Evans, Jr. et al. ................. 424/117 |

*Primary Examiner*—Jerome D. Goldberg
*Attorney, Agent, or Firm*—James C. Haight

[57] ABSTRACT

Two β-lactamase inhibitors which are new substance and designated MC696-SY2-A substance and MC696-SY2-B substance, respectively, are produced by a new strain of *Streptomyces fulvoviridis* and recovered from the culture broth of this strain. Administration of the MC696-SY2-A and -B substances together with penicillins and/or cephalosporins is useful in a chemotherapeutic treatment of infections by such bacteria which are resistant to penicillins and/or cephalosporins.

6 Claims, 2 Drawing Figures

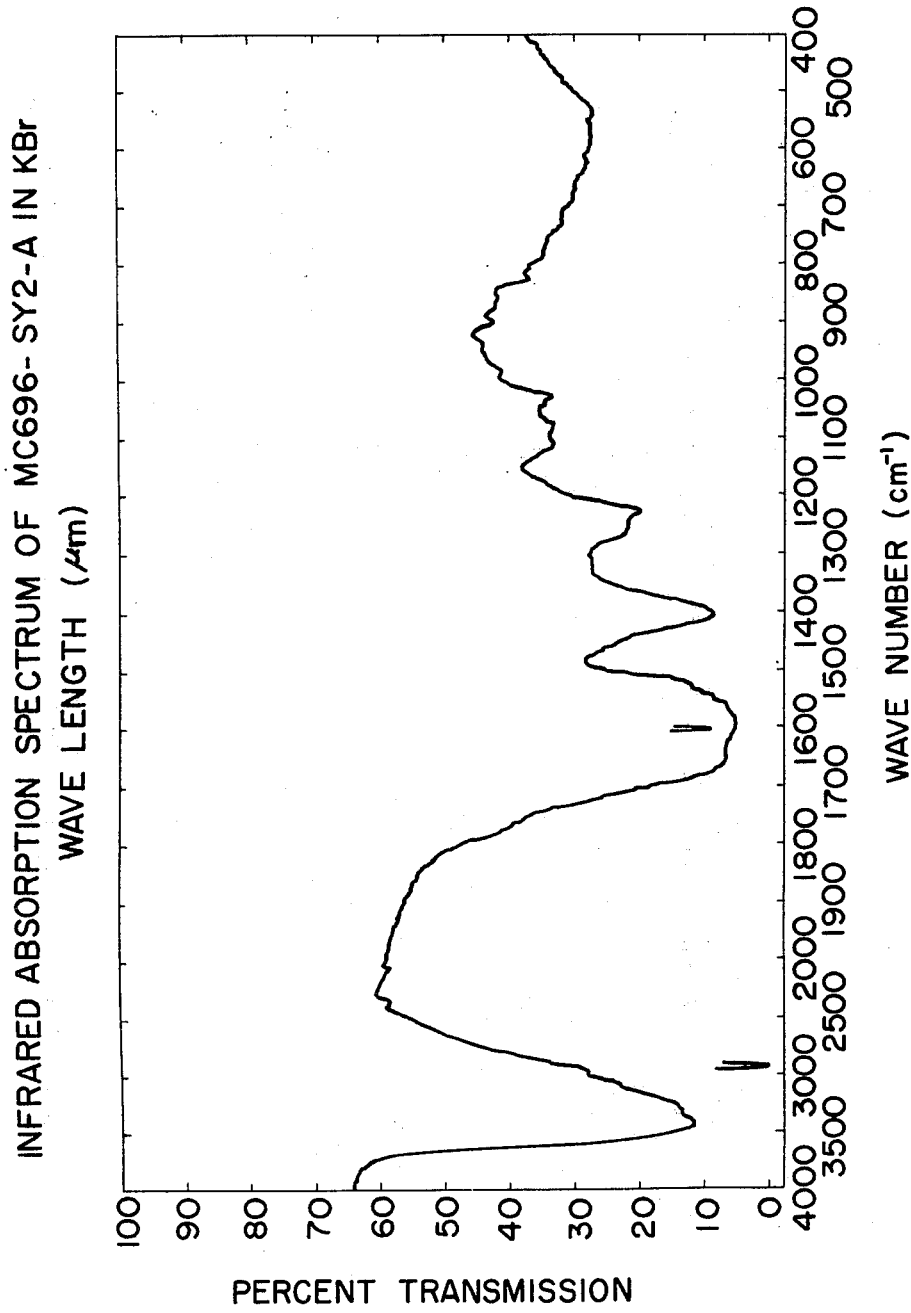

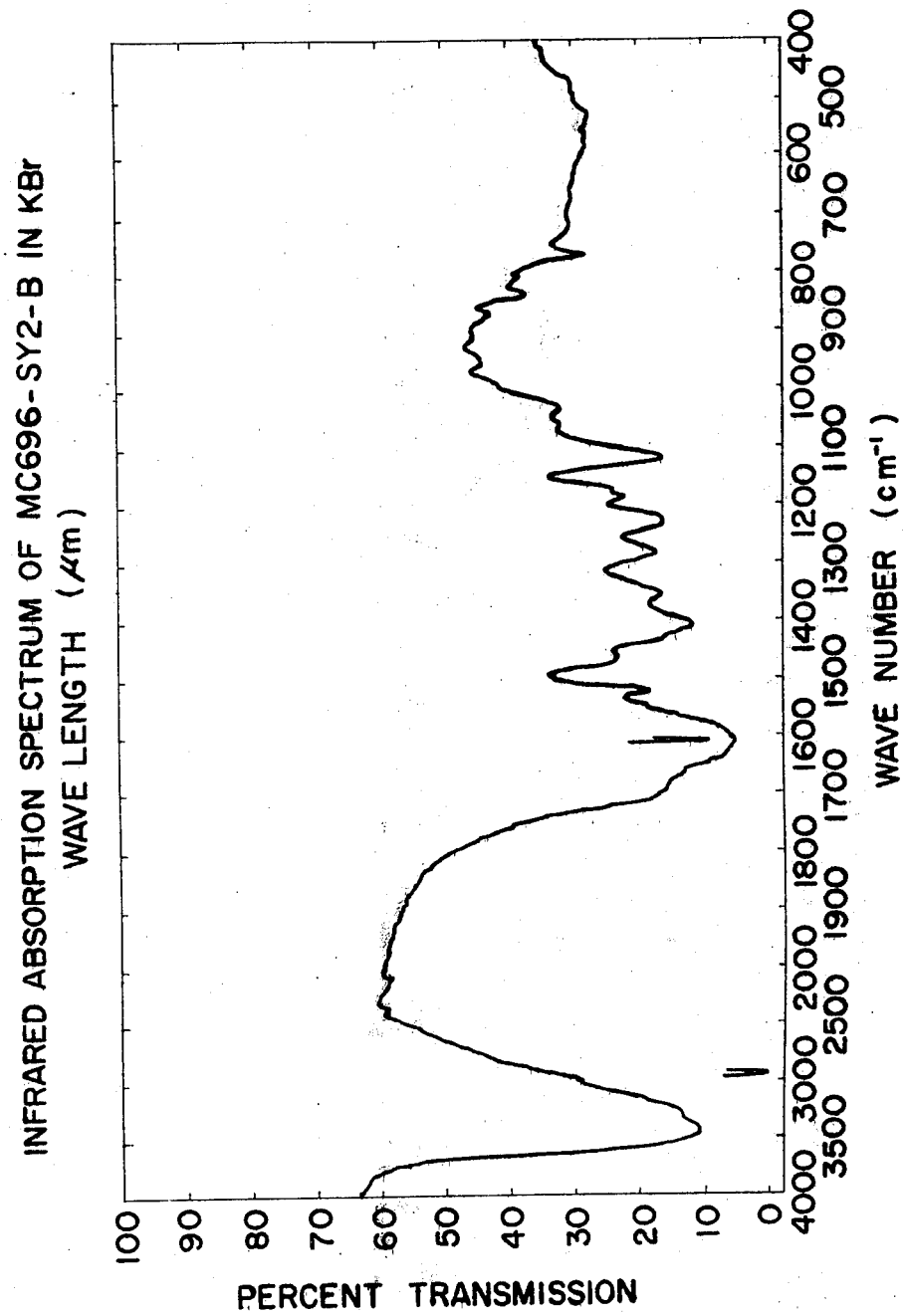

TWO SUBSTANCES INHIBITING BETA-LACTAMASE AND THEIR PRODUCTION

BACKGROUND OF THE INVENTION

This invention relates to two new substances inhibiting β-lactamase and to their production. More particularly, this invention relates to the new enzyme inhibitors designated MC696-SY2-A and MC696-SY2-B substances, respectively, and to a process for the preparation of these new enzyme inhibitors by cultivation of a species of Streptomyces classified *Streptomyces fluvovirens*. This invention also relates to the recovery and purification of the specific inhibitors and their use for pharmaceutical purposes.

Hereinafter by the term "MC696-SY2 substance", is meant the MC696-SY2-A or -B substance or their mixture, unless otherwise be described.

It is well known that a number of microorganisms including pathogenic bacteria produce β-lactamases which cleave the β-lactam ring existing commonly in both molecules of penicillins and cephalosporins, and this is the mechanism of resistance by bacteria resistant to penicillins and cephalosporins. (see N. Citri: "Penicillinase and other β-lactamases" and "The Enzymes" (edited by P. D. Boyer) vol. IV. p.23–46, Third Ed., Academic Press. 1971.) Since the β-lactamase inhibitor inhibits the activity of β-lactamase (including penicillinase and cephalosprinase), administration of the β-lactamase inhibitor along with penicillins or/and cephalosporins will be useful for the chemotherapy of diseases caused by the resistant bacteria to penicillins or/and cephalosporins. Although aminobenzyl-penicillin (commercially available under a trade name "ampicillin") is widely on the market as the most useful synthetic penicillin active against Gram-positive and -negative bacteria, bacteria resistant to the widely used synthetic penicillins, including aminobenzylpenicillin, have frequently appeared in recent years. Therefore, it has been sought to provide a means by which the widely used synthetic penicillins such as aminobenzylpenicillin can be made active even against the synthetic penicillin-resistant bacteria, and particularly against the aminobenzylpenicillin-resistant bacteria. Administration of β-lactamase inhibitor along with the synthetic penicillin is useful and effective as a means to make said synthetic penicillin active even against the bacteria which are fast or resistant to said penicillin.

In an attempt to obtain new β-lactamase inhibitor, we collected various soil samples, isolated microorganisms from such soil samples and investigated metabolism products produced by such isolated microorganisms. We isolated a new microorganism from a soil sample collected in Okazaki-City in Aichi-Prefecture, Japan in May, 1970, and we have confirmed that this microorganism now designated as strain MC696-SY2 is a new strain of the known species *Streptomyces fulvoviridis*. Furthermore, we have found that β-lactamase inhibitors are produced and accumulated in the culture broth of the strain MC696-SY2, and we have succeeded in isolating these β-lactamase inhibitors from the culture broth and designated these inhibitors as MC696-SY2-A substance and MC696-SY2-B substance, respectively.

OBJECTS AND SUMMARY OF THE INVENTION

An object of the present invention is to provide new β-lactamase inhibitors which may usefully be administered together with the synthetic penicillins for the purpose of making said synthetic penicillin active even against such bacteria resistant to said synthetic penicillins. Another object of the present invention is to provide the MC696-SY2-A and -B substances, either alone or in mixture, as a new β-lactamase inhibitor. A further object of the present invention is to provide a process for the preparation of the MC696-SY2-A and -B substances by cultivating the strain MC696-SY2. Other objects of the present invention will be clear from the following descriptions.

According to an aspect of the present invention, there is provided a substance selected from the group consisting of MC696-SY2-A substance and MC696-SY2-B substance which are each a labile substance of an acidic nature, which inhibit the activity of β-lactamase, which are each soluble in water but insoluble in butanol, ethyl acetate, ethyl ether, chloroform and benzene, and which are hydrolisable to give amino acids; the MC696-SY2-A substance further shows an inhibitory activity to the growth of *Bacillus subtilis*, *Bacillus anthracis*, Proteus species, *Staphylococcus aureus*, *Micrococcus flavus*, *Micrococcus lysodeikticus*, *Klebsiella pneumoniae*, Shigella species and *Salmonella typhosa*, giving the elements carbon, hydrogen, nitrogen and sulfur and ash comprising sodium upon the elemental analysis thereof, and giving ammonia, glycine, tyrosine, aspartic acid and glutamic acid when hydrolyzed with 6N hydrochloric acid at 100°C for 16 hours in a sealed tube, and the infrared absorption spectrum of a sample of the MC696-SY2-A substance pelleted in potassium bromide being shown in FIG. 1 of the attached drawings. The MC696-SY2-B substance given a purple color in ninhydrin reaction, weakly positive Rydon-Smith reaction attributed to amide bond, a brownish purple color in anthrone reaction and negative ferric chloride reaction, giving the elements carbon, hydrogen, nitrogen, oxygen and sulfur and the ash are obtained upon the elemental analysis thereof; ammonia, aspartic acid, glutamic acid and glycine but no aminoadipic acid are produced when hydrolyzed with 6N hydrochloric acid at 105°C for 16 hours in a sealed tube, and the infrared absorption spectrum of a sample of the MC696-SY2-B substance pelleted in potassium bromide being shown in FIG. 2 of the attached drawings.

The present invention embrace the MC696-SY2-A and -B substances, either alone or in a mixture of them, which may be present in a dilute solution, as a crude concentrate, as crude solid, as purified solid, as free acid and as salts with metals or organic bases.

According to a second aspect of the present invention, there is provided a process for the preparation of MC696-SY2-A substance and MC696-SY2-B substance, which comprises cultivating a strain of *Streptomyces fulvoviridis* under aerobic conditions in a culture medium containing assimilable carbon and nitrogen sources to produce and accumulate the MC696-SY2-A and -B substances in the culture, recovering a mixture of the MC696-SY2-A and -B substances from the culture, and then, if required, separating said mixture into the MC696-SY2-A substance and MC696-SY2-B substances in a chromatographic manner.

It has been found that when the above-mentioned process of the present invention is carried out in such a manner that the cultivation of a strain of *Streptomyces fulvoviridis* is conducted under aerobic condition in a culture medium further containing a water-soluble cobalt salt such as cobalt chloride, cobalt sulfate, cobalt nitrate, cobalt phosphate and cobalt acetate, the MC696-SY2-A and -B substances are produced and recovered in an improved yield.

According to a third aspect of the present invention, therefore, there is provided a process for the preparation of the MC696-SY2-A substance and MC696-SY2-B substance, which comprises cultivating a strain of *Streptomyces fulvoviridis* under aerobic conditions in a culture medium containing assimilable carbon and nitrogen sources as well as at least one water-soluble cobalt salt to produce and accumulate the MC696-SY2-A and -B substances in the culture, recovering a mixture of the MC696-SY2-A and -B substances from the culture, and then, if required, separating said mixture into the MC696-SY2-A substance and MC696-SY2-B substance in a chromatographic manner.

BRIEF DESCRIPTION OF THE DRAWINGS

FIG. 1 shows a curve of the infrared absorption spectrum of sample of the MC696-SY2-A substance according to the present invention pelleted in potassium bromide.

FIG. 2 shows a curve of the infrared absorption spectrum of a sample of the MC696-SY2-B substance according to the present invention pelleted in potassium bromide.

DETAILED DESCRIPTION OF THE INVENTION

For producing the MC696-SY2 substance according to the process of the present invention, a strain of *Streptomyces fulvoviridis* may be used as long as this strain produces the MC696-SY2 substance. An example of the strain which may be used in the present invention is the above-mentioned strain MC696-SY2 of *Streptomyces fulvoviridis*. This strain MC696-SY2 was deposited on July 8, 1972 in a Japanese authorized depository "Fermentation Research Institute, Agency of Industrial Science and Technology", Inage, Chiba-City, Japan, under a deposit number FERM-P 1504. The strain MC696-SY2 was then deposited also in the American Type Culture Collection, Washington, D.C., U.S.A., under ATCC. number 21954.

Cultural and taxonomic characteristics of the strain MC696-SY2 are described below.

a. Microscopical Morphology

Strain MC696-SY2 has well-branched substrate mycelia and develops straight to flexous aerial hyphae without forming spiral structure and whorl-branching. Tips of the aerial hyphae bear chains of more than 10 conidial spores of which the surface is smooth or occasionally warty on sucrose nitrate agar medium. The size of each spore is 0.5–0.7 by 0.7–1.1 microns.

b. Characteristics on Various Media

The designation of color in [ ] mentioned below follows the color standard given in "Color Harmony Manual" published by the Container Corporation of America.

1. On sucrose nitrate agar incubated at 27°C: Colorless to pale yellowish brown or yellowish brown colored growth develops aerial mycelium of light brownish gray to brownish gray color [3 fe, Silver gray]. No soluble pigment.
2. On glucose asparagine agar incubated at 27°C: Colorless to pale yellowish growth without aerial hyphae. No soluble pigment.
3. On glycerol aspagine agar (ISP No. 5 medium) incubated at 27°C: colorless to pale yellowish brown or yellowish brown colored growth with aerial hyphae of light gray to light brownish gray color [3 fe, Silver gray]. No soluble pigment.
4. On starch-inorganic salt agar (ISP No. 4 medium) incubated at 27°C: Pale yellow to pale yellowish brown growth with aerial hyphae of brownish white to light brownish gray [3 fe, Silver gray]. No soluble pigment.
5. On tyrosine agar (ISP No. 7 medium) incubated at 27°C: Colorless to pale yellowish brown growth with aerial hyphae of light brownish gray to light olive gray color. No soluble pigment.
6. On nutrient agar incubated at 27°C: Colorless to pale yellow growth with thin aerial hyphae or grayish white color. No soluble pigment.
7. On yeast-malt agar (ISP No. 2 medium) incubated at 27°C: Pale yellow to pale yellowish brown growth with aerial hyphae of grayish white to light brownish gray color. No soluble pigment.
8. On oat meal agar (ISP No. 3 medium) incubated at 27°C: Pale yellow to yellowish brown growth with aerial hyphae of white to light brownish gray color. Soluble pigment of yellowish tinge.
9. On calcium-malate agar incubated at 27°C: Colorless to pale yellow growth with aerial hyphae of brownish white to light brownish gray color. No soluble pigment.
10. On glucose-peptone-gelatin medium stabbed-incubated at 24°C: Colorless to pale yellow growth with aerial hyphae of grayish white to light gray or light brownish gray color. No soluble pigment.
11. On gelatin stabbed-incubated at 20°C: Colorless to pale yellow growth with aerial hyphae of grayish white to light gray color. No soluble pigment.
12. On skimmed milk incubated at 37°C: Colorless growth without aerial hyphae. Soluble pigment is pale yellowish orange color.
13. On glycerol nitrate agar incubated at 27°C: Colorless to yellowish brown growth with aerial hyphae of grayish white to light brownish gray color. No soluble pigment.
14. On cellulose incubated at 27°C: Fair amount of growth without decomposition of cellulose.

c. Physiological Properties

1. Temperature for growth

Growth on glucose asparagine agar was examined at 20°, 24°, 27°, 30°, 37° and 50°C. The strain MC696-SY2 grew at all temperatures tested except at 50°C. Optimum temperature for good growth was observed between 20° and 27°C.

2. Liquefaction of gelatin

Plain gelatin (15%) started to liquefy from 5th day when incubated at 20°C, and 15% gelatin in a glucose-peptone-gelatine medium started to liquefy from 19th day when incubated at 27°C. Grade of liquefaction was medium.

3. Hydrolysis of starch

Starch broth in starch agar and starch-inorganic agar was hydrolyzed starting from 5th day when incubated at 27°C. Grade of hydrolysis was medium.

4. Coagulation and peptonization in skimmed milk

When incubated at 37°C, the coagulation was completed at 5th day and the peptonization was observed later. The peptonization was completed at 7–10 days. Grade of the reaction was medium to strong.

5. Formation of melanin-like pigment

No pigmentation was observed on either Tryptone-yeast broth (ISP No. 1 medium), peptone-yeast-iron agar (ISP No. 6 medium) or tyrosine agar (ISP No. 7 medium), when incubated at 27°C.

6. Liquefaction of calcium-malate

Calcium malate in calcium malate agar was liquefied around the growth, when incubated at 27°C.

7. Utilization of carbohydrates for growth

The following carbohydrates were utilized in Pridham-Gottlieb basal medium when incubated at 27°C; L-arabinose, D-xylose, L-rhamnose, glucose, D-fructose and D-mannitol. Sucrose, raffinose and inositol were not utilized.

Summarizing the above characteristics, the strain MC696-SY2 belongs to the genus Streptomyces without forming a spiral and whorl. The surface of the spore is smooth, and the color of growth on various media is pale yellow to yellowish brown. Color of aerial hyphae is grayish white to light brownish gray. Almost no soluble pigment is produced. Proteolysis and starch hydrolysis is medium to strong grade. No melanine-like pigment is produced. L-Arabinose, D-xylose, L-ramnose, glycose, D-fructose and D-mannitol are utilizable for growth, but sucrose, raffinose and inositol are not utilizable as a carbon source.

On the basis of the above results, the strain MC696-SY2 was compared with known species of streptomyces, and found to resemble the following species. *Streptomyces flavovirens* (Waksman) Waksman and Henrici (J. of Systematic Bacteriology, vol. 18, p.114, 1968 and S. A. Waksman "The Actinomycetes" vol. 2, p.210, 1961, The Williams & Wilkins Co., Baltimore, U.S.A.), *Streptomyces nigrifaciens* Waksman (J. of Systematic Bacteriology, vol. 18, p.150, 1968 and S. A. Waksman "The Actinomycetes" vol. 2, p.247, 1961, The Williams and Wilkins Co., Baltimore, U.S.A.), *Actinomyces fulvoviridis* Kuchaeva et al. (J. of Systematic Bacteriology, vol. 18, p.321, 1968 and N. A. Krasil'nikov et al. "Biology of Antibiotic-producing Actinomycetes" in Transaction of the Institute of Microbiology, Academy of Sciences of the U.S.S.R., No. 8, p. 222–251, 1966: English translation in IPST Cat. No. 1292), *Streptomyces scabies* (Thaxter) Waksman & Henrici (J. of Systematic Bacteriology, vol. 18, p. 374, 1968 and S. A. Waksman "The Actinomycetes" vol. 2, p. 274, The Williams and Wilkins Co., Baltimore, U.S.A.), and *Streptomyces flavogriseus* (Duche) Waksman & Henrici (J. of Systematic Bacteriology, vol. 19, p. 429, 1969 and S. A. Waksman "The Actinomycetes" vol. 2, p. 209, 1961, Baltimore, U.S.A.). The type cultures of the above five species were compared with the strain MC696-SY2 on sucrose nitrate agar at 27°C, glucose asparagine agar at 27°C, starch-inorganic salt agar (ISP No. 4 medium) at 27°C in respects of their cultural characteristics on the media including melanin-like pigmentation, coagulation and peptonization of skimmed milk, carbohydrates utilization on Pridham-Gottlieb basal medium. The results indicate that the strain MC696-SY2 and the five strains resembled each other very closely, but the following differences were noted, as shown in Table 1 below.

Table 1.

| Medium | | Strain MC696-SY2 | Streptomyces flavovirens (ISP 5062) | Streptomyces nigrifaciens (ISP 5071) | Actinomyces fulvoviridis (ISP 5210) | Streptomyces scabies (ISP 5078) | Streptomyces flavogriseus (ISP 5323) |
|---|---|---|---|---|---|---|---|
| Milk | Coagulation | + rapid | + rapid | + rapid | + | − | (+) |
| | Peptonization (observed for 10 days) | + rapid | + rapid | + rapid | + | − | − |
| Sucrose Nitrate agar | Aerial hyphae color | light brownish gray | yellowish gray tinge | grayish white tinge | light brownish gray | light brownish gray | brownish white tinge |
| | Growth color | pale yellowish brown grayish yellowish brown | colorless | colorless | colorless– brownish gray | colorless– grayish yellowish brown | colorless pale yellowish brown |
| | Soluble pigment | − | pale yellow | − | − | − | − |
| Glycerol Nitrate agar | Aerial hyphae color | light brownish gray | yellowish gray tinge | grayish white tinge | pale brownish gray | pale brownish gray | slightly white |
| | Growth color | pale yellowish brown | colorless | colorless | yellowish brown | colorless yellowish brown | colorless– |
| | Soluble pigment | − | slightly yellow | − | − | slightly yellow tinge | − |

*Streptomyces flavovirens* ISP 5062 and *Streptomyces nigrifaciens* ISP 5071 differ from the strain MC696-SY2 in characteristics on both sucrose nitrate agar and glycerol nitrate agar in particular. *Streptomyces scabies* ISP 5078 and *Streptomyces flavogriseus* ISP 5323 differ from MC696-SY2 in respect to coagulation and peptonization of skimmed milk. Accordingly *Actinomyces fulvoviridis* ISP 5210 most closely resembled MC696-SY2. Since genus *Actinomyces* defined by Russian group including Kuchaeva is recognized to be genus *Streptomyces*, the strain MC696-SY2 is reasonably identified as *Streptomyces fulvoviridis*.

Mutation of actinomycetes occurs frequently in either artificial or spontaneous conditions. Therefore, this invention includes the use of the strain MC696-SY2 and its mutants. In another word, it includes the use of all strains belonging to *Streptomyces* which produce the MC696-SY2 substance.

Mc696-SY2 substance can be obtained by aerobic cultivation of spores or mycelia of a MC696-SY2 producing strain such as *Streptomyces fulvoviridis*. Constituents of culture medium commonly used for the cultivation of usual actinomycetes can be used. For example, glycerol, glucose, lactose, sucrose, starch, maltose molasses, fat, oil or others are available for the carbon source. Peptone, meat extract, corn steep liquor, cotton seed powder, peanut powder, soybean powder, yeast extract, N-Z amine, casein, sodium nitrate, ammonium nitrate or others are available for the nitrogen source. In addition, sodium chloride, phosphate, calcium carbonate, magnesium sulfate or others can be employed for the salts in the medium. Various heavy metal salts are also added, if necessary. Since all materials utilizable by the MC696-SY2-producing strains for the production of the MC696-SY2 substance can be employed, those for known actinomycetes can be used. For the production in large scale, liquid culture is preferable. Any temperatures at which the MC696-SY2 producing strain is able to grow and to produce MC696-SY2 substance are employed, but 25°–35°C is mostly preferable. The cultivation continues until sufficient amount of MC696-SY2 substance is produced and accumulated in the culture broth. For example, a medium consisting of glycerol 2%, soybean powder 1.5%, $MgSO_4.7H_2O$ 0.1% and $K_2HPO_4$ 0.1% in city water is added with silicone oil 0.02% (Shinetsu Chemicals Co. KM66) and sterilized at pH 6.8. This medium is inoculated with spores or mycelia harvested from slant culture of the strain MC696-SY2. When it is shake-cultured aerobically at 27°C, MC696-SY2 substance is accumulated in the culture broth at the end of incubation for 3–5 days.

MC696-SY2 substance can be assayed by its inhibition of penicillinase ($\beta$-lactamase) with methods of iodometric titration and agar plate assay as described below.

1. Iodometric titration method

A solution of 0.1 ml of 0.1 M phosphate buffer (pH 7.0) containing the inhibitor, 0.25 ml of penicillinase in the same buffer (8,000 units/ml) prepared from penicillinase (300 units/mg; Nutritional Biochemical Corp., Ohio, U.S.A.) or from $\beta$-lactamase$_{75}$ produced by $E.\ coli$ K-12 W3630 $R_{75}^+$ (H. Ogawara, K. Maeda and H. Umezawa: Biochem. Biopys. Acta 289, 203–211, 1972), and 0.4 ml of the buffer was placed in a test tube, and shaken gently at 37°C for 5 minutes. To the mixture, 0.25 ml potassium benzylpenicillin (8,000 units/ml) in the same buffer was added, shaken continuously for 35 minutes and then heated at 100°C for exactly 1 minute in a boiling water bath to stop the reaction. A control without an inhibitor, a blank without penicillinase and another blank without the inhibitor or penicillinase were prepared and treated in the same manner as the sample solution. To all test tubes containing the control and the blanks, 5 ml of 0.01 N iodine was added. After 15 minutes, the excess iodine was titrated with 0.01 N sodium thiosulfate, using 1% starch solution as an indicator. The value $T_c$ was calculated from the titre of the blank (without penicillinase or the inhibitor) minus the control without the inhibitor) and the value $T_s$ was calculated from the titre of another blank (without penicillinase) minus the sample containing penicillin, penicillinase and the inhibitor. The percent inhibition was calculated according to the following equation:

$$\% \text{ Inhibition} = 100 - \frac{T_s}{T_c} \times 100$$

In the procedure, the amount of MC696-SY2 substance showing 50% inhibition ($ID_{50}$) is thereafter defined as one unit.

A sample of MC696-SY2-A and -B substances (88,000 and 6,670 units/mg, respectively) was dissolved in pH 7.0 phosphate buffer (100 — 0.1 mcg/ml.) A cephalosporinase-producing strain, $Escherichia\ freundii$ GN346, was incubated for 16 hours at 37°C, diluted 10-fold with bouillon, and incubated for 2 hours to prepare a cephalosporinase solution. When the inhibitory activity against cephalosporinase was determined by the iodometric titration method as described above, using 0.10 ml of the inhibitor solution, 0.25 ml of the diluted cephalosporinase solution and 0.5 ml of cephazoline solution (5 mg/ml), 1.1 and 0.84 units of the inhibitors, MC696-SY2-A and -B, gave 50% inhibition of the cephalosporinase, respectively.

2. Agar plate method

Penicillinase (500,000 units/ml) purchased from Tokyo Kasei Co. was used. $Staphylococcus\ aureus$ FDA 209P on an agar slant was suspended in 10 ml saline solution and used as the test organism. The agar medium for the penicillin assay was utilized. Ten ml of melted agar medium, at 48°C, containing 500 units of penicillinase, 100 units of potassium benzylpenicillin and the suspension of the test organism (1%) was plated. Within 15 minutes to 2 hours after the preparation of the plates, a disc containing a suitable amount of an inhibitor was placed on the agar. After incubation overnight at 37°C, a clear inhibition zone appeared. The relation shown by the formula, $d = \alpha \log C + \beta$ ($\alpha, \beta$ = constants) was found between the diameter of the inhibition zone (d) and the concentration of the inhibitor (C) in the range of 3–150 units/ml.

In the fermentative production of MC696-SY2 substance, a series of tests were made to examine the relationship between the composition of the culture medium, fermentation days and the $\beta$-lactamase-inhibiting activity of the culture broth when the strain MC696-SY2 was inoculated in various media of 100 ml contained in 500 ml volume of shaking flask and shake-cultured at 27°–29°C on reciprocal shaking machine with amplitude of 8 cm and 130 strokes per minute. The results are shown in Tables 2 and 3 below.

Table 2.

| Medium No. | Composition | Fermentation days | | | | | |
|---|---|---|---|---|---|---|---|
| | | 3 days | | 4 days | | 5 days | |
| | | pH | % Inhibition | pH | % Inhibition | pH | % Inhibition |
| 1 | 2% Starch | 6.8 | 65.4 | 7.6 | 60.6 | 8.0 | 38.8 |
| 2 | 2% Glucose | 5.6 | 79.2 | 7.4 | 78.6 | 8.0 | 58.8 |
| 3 | 2% Glycerol | 6.2 | 82.7 | 6.2 | 89.2 | 6.6 | 71.0 |
| 4 | 2% Maltose | 5.4 | 69.0 | 6.6 | 25.0 | 6.8 | 32.2 |
| 5 | 2% Lactose | 8.0 | 41.6 | 8.0 | 35.6 | 5.2 | 61.2 |
| 6 | 2% Sucrose | 8.0 | 20.4 | 8.0 | 19.8 | 8.0 | 12.8 |
| 7 | 2% Soybean oil | 5.2 | 3.6 | 5.2 | 0 | 5.2 | 3.4 |
| 8 | (E) medium *1 | 8.0 | 20.4 | 8.0 | 14.2 | 8.0 | 16.0 |
| 9 | (F) medium *2 | 8.0 | 69.0 | 8.0 | 50.0 | 8.0 | 38.8 |

Table 2.-continued

| Medium No. | Composition | Fermentation days | | | | | |
|---|---|---|---|---|---|---|---|
| | | 3 days | | 4 days | | 5 days | |
| | | pH | % Inhibition | pH | % Inhibition | pH | % Inhibition |
| 10 | (B) medium *3 | 7.8 | 86.0 | 8.0 | 50.0 | 8.0 | 29.0 |

*1 1.0% Polypeptone, 0.2% Yeast extract, 2.5% Glycerol, 0.6% $CaCO_3$, Tap water, pH 6.8.
*2 1.5% Soybean powder, 2.0% Starch, 0.2% $MgSO_4 \cdot 7H_2O$, Tap water, pH 6.8.
*3 1.5% Prorich (Ajinomoto Products), 1.0% Starch (Potato), 1% Glucose 0.1% $K_2HPO_4$, 0.1% $MgSO_4 \cdot 7H_2O$, 0.3% NaCl, Tap water, pH 6.8.

Table 3.

| Medium No. | Composition | Fermentation days | | | | | |
|---|---|---|---|---|---|---|---|
| | | 3 days | | 4 days | | 5 days | |
| | | pH | Inhibition % | pH | Inhibition % | pH | Inhibition % |
| 1 | 1.5% Soybean powder | 6.8 | 76.5 | 8.0 | 61.3 | 8.0 | 25.8 |
| 2 | 0.3% Yeast extract | 7.4 | 44.0 | 8.0 | 45.2 | 8.0 | 22.5 |
| 3 | 1.5% Prorich | 7.4 | 29.3 | 7.8 | 29.0 | 7.8 | 32.2 |
| 4 | 1.5% Pharma Media | 6.0 | 26.5 | 7.2 | 42.0 | 8.0 | 42.0 |
| 5 | 1.0% Polypeptone | 7.0 | 8.6 | 8.0 | 4.5 | 8.0 | 3.0 |
| 6 | 0.5% Meat extract | 7.4 | 32.3 | 8.0 | 6.5 | 8.0 | 22.5 |
| 7 | 1.5% Meat extract | 7.4 | 76.5 | 7.8 | 40.0 | 7.8 | 29.0 |
| 8 | 1.0% Yeast extract | 5.0 | 5.8 | 5.0 | 8.0 | 5.0 | 9.7 |
| 9 | 2.0% Cornsteep liquor | 6.8 | 44.0 | 8.0 | 47.0 | 8.0 | 45.2 |
| 10 | (F) medium* | 7.4 | 58.8 | 8.0 | 30.3 | 8.0 | 22.5 |

*Same as Medium No. 9 in Table 2

In Table 2, medium containing soybean powder 1.5%, $MgSO_4 \cdot 7H_2O$ 0.1% and $K_2HPO_4$ 0.1% was added with 0.2% antifoaming agent (Silicone KM66, 10% aqueous solution) after adjusting pH to 6.8 and used as the basal medium. In Table 3, 2% glucose was used instead of soybean powder in the above.

Each fermentation broth was diluted four times and its 0.1 ml was taken and examined for its inhibitory activity by the iodometric titration.

The production of MC696-SY2 substance was observed at the 2nd day of fermentation and reached a maximum at the end of 2–5 days of fermentation at pH of 6.8–8.0 in the culture medium. 250–300 units/ml of MC696-SY2 substance was observed in the fermentation broth, as determined by the agar plate method. The above results suggested that glycerol, glucose and starch were favourable for the carbon source, and soybean powder, meat extract, corn steep liquor and cotton seed of Pharma-Media were preferable as the nitrogen source.

In another experiment, it has been found that addition of cobalt salt increased the production of MC696-SY2 substance significantly, as described in the later. The cobalt salt which may be added to the culture medium may be a water-soluble one such as a salt of cobalt with an inorganic acid or an organic acid such as a lower aliphatic acid. Examples of available cobalt salt include cobalt chloride, cobalt bromide, cobalt sulfate, cobalt nitrate, cobalt phosphate, cobalt acetate, cobalt citrate and the like. The concentration of the cobalt salt may be 0.0001% to 0.001% by weight of the culture medium.

MC696-SY2 substance is produced by tank culture as well as shaking flask culture. For example, 15 liters of a culture medium is prepared in a 30 liters' fermentor and sterilized at 120°C for 30 minutes. The sterilized medium is inoculated with 200 ml of the cultured broth was previously shake-cultured for 2 days. The fermentation in the tank proceeds under aeration of 15 liters sterile air per minute, with stirring at 200 r.p.m.

By the tank culture, the production of the MC696-SY2 substance reaches a maximum at the end of 45–50 hours of fermentation.

MC696-SY2 substance is labile The activity in the culture broth filtrate decreased to 60.5, 34.5 and 15.1% after 3, 8 and 10 days' storage in a refrigerator (5°C). Even as a dried powder, the activity rapidly disappeared at room temperature in a desicator. However, they were stable at −20°C. The stability of the broth filtrate (180 units/ml) and of an aqueous solution of a crude powder (mixture) (13.3 units/mg; 8 mg/ml) and aqueous solutions of partially purified powder of MC696-SY2-A (184 units/mg; 500 mcg/ml) and -B (363 units/mg; 500 mcg/ml) was tested at various pH's as shown in Tables 4 and 5 below.

Table 4.

| Stability of broth filtrate at various pH's Activity remaining % | |
|---|---|
| 0°C, 30 min. | 50°C, 30 min. |
| 0 | — |
| 43 | 65 |
| — | 80 |
| 38 | — |
| — | 30 |

Table 5.

| | Stability of aqueous solutions containing crude or purified powder (at 50°C) Activity remaining % | | | | |
|---|---|---|---|---|---|
| pH | Crude powder 30 min. | MC696-SY2-A 30 min. | 2 hrs. | MC696-SY2-B 30 min. | 2hrs. |
| 2.3 | — | 0 | — | 0 | — |
| 3.0 | 25 | 0 | — | 0 | — |
| 4.0 | 61 | 8 | — | 15 | 10 |
| 5.0 | 84 | — | — | — | — |
| 5.2 | — | 65 | 11 | 62 | 28 |
| 6.0 | 85 | 82 | 66 | 100 | 69 |
| 6.8 | — | 100 | 76 | 100 | 64 |
| 7.0 | 99 | — | — | — | — |
| 8.0 | 49 | 100 | 70 | 100 | 71 |
| 9.0 | 20 | — | — | — | — |

Table 5.-continued

Stability of aqueous solutions containing crude or purified powder (at 50°C) Activity remaining %

| pH | Crude powder 30 min. | MC696-SY2-A 30 min. | MC696-SY2-A 2 hrs. | MC696-SY2-B 30 min. | MC696-SY2-B 2hrs. |
|---|---|---|---|---|---|
| 10.5 | — | 61 | 39 | 84 | 28 |

The influence on the activity of calf serum was tested with a solution containing 10 mg/ml of a crude powder (6.7 units/mg) by the disc method. The activity was reduced to 100, 88.5, 69.5 and 51.5% in 6.25, 12.5, 25 and 50% calf serum-bouillon solutions, respectively.

A crude powder (28.3 units/mg) was dissolved in 0.1 M phosphate buffer (pH 7) at 20 mg/ml. To portions of the solution, 0.01 M 2-mercaptoethanol, dithiothreitol or glutathione were added, and the mixtures allowed to stand in a refrigerator overnight. The activity in all solutions completely disappeared, while a solution with no reducing agent retained 57.5% of the original activity.

Since MC696-SY2 substance is easily soluble in water, it exists substantially in the liquid part of the fermented broth of the MC696-SY2 substance-producing strain of Streptomyces fulvoviridis. It is not practically extracted with butanol, ethyl ether, chloroform, benzene, etc. The extraction with those solvents is utilized to remove impurities during the recovery of MC696-SY2 substance, if necessary. For the recovery of MC696-SY2 substance, the broth filtrate is may at first be obtained by filtration or centrifugation of the culture broth to remove solid part with the mycelia. MC696-SY2 substance in the broth filtrate or in other aqueous solution may be recovered therefrom with aid of adsorbents. Active carbon is one favorable adsorbent, and MC696-SY2 substance adsorbed on active carbon may be eluted with aqueous acetone, aqueous propanol, etc., especially in good yield with 50% acetone or 30% propanol in water at pH 7.0–7.5. On the basis of the acidic character of MC696-SY2 substance, anion-exchange resins and anion-exchange celluloses are also available useful to make the recovery of MC696-SY2 substance. In this case, strong basic anion-exchange resins such as quarternary ammonium hydroxide derivative of polystyrene containing groups-$N(CH_3)_3OH$ as the functional group commercially available under a registered trade name "Amberlite" IRA-400 (Rohm & Haas Co., U.S.A.), weakly basic anion-exchange resins such as a polyaminated polystyrene commercially available under a registered trade name "Amberlite" IR-4B (Rohm & Haas Co., U.S.A.), DEAE-cellulose (Brown Co. Ltd.) etc. are useful. The procedure, wherein MC696-SY2 substance in a neutral aqueous solution is adsorbed to DEAE-cellulose ($OH^-$ or $Cl^-$ form) and eluted with a buffer solution containing sodium chloride by increasing the concentration of sodium chloride in buffer, is one of the most effective methods for the separation of a mixture of MC696-SY2-A and -B substances into the single A substance and B substance and for the preparation of more active substance from the eluate containing MC696-SY2 substance obtained by the active carbon process as described above. Although the active carbon process is available to separate inorganic salts from MC696-SY2 substance, molecular sieves such as a derivative of dextran gel cross-linked with epichlorohydrin commercially available under a registered trade name "Sephadex" G-25 or G-10 (Pharmacia Fine Chemicals) and high surface area copolymer such as Amberlite XAD-2 or -4 (Rohm & Hass Co.) are quite favorable for this purpose.

Celite (Johns Manville Co.), bentonite and activated clay, which are known as a filter aid, were added to the broth filtrate at 10% (W/V), shaked for 30 minutes at room temperature and removed by filtration, and activities in each filtrate were determined. Since 84, 84 and 90% of the original activity remained in such respective filtrate, all filter aids tested were suitable.

MC696-SY2 -A and -B substances isolated are not completely pure at present, because of its labile nature. Therefore, the properties of the inhibitors obtained at various purity will be described in the following.

MC696-SY2-B substance having a potency of 6,670 units/mg gave a purple color by ninhydrin reaction, weakly positive Rydon-Smith reaction attributed to amide bond, brownish purple by anthrone reaction and negative ferric chloride reaction. By acid hydrolysis of MC696-SY2-B substance (6,670 units/mg), by heating 3.1 mg of this substance in 0.31 ml of 6N HCl at 105°C for 16 hours in a sealed tube, $NH_3$ (1.59%), Asp. (5.12%), Glu. (5.86%), Gly. (1.05%), Tyr. (0.40%) were detected in the hydrolysate by amino acid analyzer, and no aminoadipic acid was found in the hydrolysate. A sample of MC696-SY2-A substance having a potency of 60,400 units/mg gave $\lambda_{max}$ at 270–272 nm ($E_{1cm}^{1\%}$ 58), and a sample of MC696-SY2-B substance having a potency of 6,670 units/mg gave $\lambda_{max}$ at 288 nm ($E_{1cm}^{1\%}$ 115) in the ultraviolet specta. Infrared specta of samples of MC696-SY2-A substance (potency 60,400 units/mg) and -B substance (potency 6,670 units/mg) in potassium bromide are shown in FIGS. 1 and 2. Analytical ultracentrifugation using 0.5% solution of a sample of MC696-SY2 -B substance (potency 707 units/mg) in 0.01 M phosphate buffer (pH 7.0) gave 113–565 as the molecular weight corresponding to 0.7–0.9 of partial specific volume. The elementary analysis of a sample of MC696-SY2-B substance (potency 6,670 units/mg) gave the following result: C, 38.29; H,5.22; N, 3.96; O, 37.50; S, 1.12; ash 180 mcg/mg.

On thin-layer chromatography on silica gel $GF_{254}$ (E. Merck AG, Darmstadt, Germany) on glass plates (5 cm × 20 cm) with n-propanol-0.1 M (pH 7) phosphate buffer (7 : 3) as the developing solvent, the Rf values of MC696-SY2-A and -B were 0.32–0.37 and 0.41–0.46, respectively. With n-butanol-methanol-water (4:1:2), the Rf was 0.20–0.23 and 0.23–0.25. The active materials were demonstrated by bioautography. After thin-layer chromatography on DEAE-cellulose (Spotfilm) (5 cm × 20 cm) (Tokyo Kasei Kogyo Co., Ltd.,), MC696-SY2-A and -B gave spots at Rf 0.54–0.60 and 0.42–0.53, respectively, with 0.2M NaCl in 0.01 M phosphate buffer (pH 7).

The kinetics of the effect of MC696-SY2-A (2.23 units/ml) and -B (1.47 units/ml) on hydrolysis of benzylpenicillin by β-lactamase$_{75}$ from E. coli K-12 W3630 $R_{75}^+$ were studied. Inhibition by MC696-SY2-A was competitive, but MC696-SY2-B was not completely competitive.

Both MC696-SY2-A and -B were not destroyed by penicillinase at 37°C for 3 hours, while benzylpenicillin was completely hydrolyzed under these conditions in one hour.

When 10 mg of a sample of MC696-SY2-A substance (potency 17,000 units/mg) was injected intravenously into mice weighing 20 g, no toxicity was seen in 10 days.

The effect of a mixture of MC696-SY2-A and -B substances on the inhibitory activity of penicillin against two strains of penicillin-resistant *Staphylococcus aureus* was tested. *S. aureus* No. B154 (resistant to penicillin, streptomycin and tetracycline) and No. B337 (resistant to erythromycin, oleandomycin, leucomycin and penicillin) were used as test organisms. Plates were prepared with 10 ml of melted nutrient agar containing 1,300, 650, 325, 163 or 0 units of the inhibitor and 1% of 16-hour test organism culture. Discs soaked in 800, 400, 100, 25 and 6.25 units/ml of standard benzylpenicillin solutions were placed on the agar plates. After incubation at 37°C for 16 hours, the diameter of inhibition zones was measured. The results are shown in Table 6 below and indicate that the inhibitors enhanced the activity of penicillin against penicillin-resistant *S. aureus*. The activity against the sensitive *S. aureus* FDA 209P was also enhanced.

Table 6.

Effect of MC696-SY2 on activity of penicillin G against S. aureus by disc method

| S. aureus No. | MC696-SY2 in agar units/ml | Diameter of inhibition zone (mm) and penicillin G (u/ml) applied to discs | | | | |
|---|---|---|---|---|---|---|
| | | 800 | 400 | 100 | 25 | 6.25 |
| | 0 | (10.5) | (9.25) | 0 | 0 | 0 |
| | 16.3 | 12.25 | 10.25 | 0 | 0 | 0 |
| B154 | 32.5 | 13.0 | 12.5 | 10.0 | 0 | 0 |
| | 65.0 | 16.5 | 14.5 | 12.5 | 10.5 | 0 |
| | 130 | 24.5 | 22.5 | 20.5 | 17.75 | 15.0 |
| | 0 | 13.0 | 11.5 | 9.5 | 0 | 0 |
| | 16.3 | 14.5 | 12.75 | 11.0 | 9.25 | 0 |
| B337 | 32.5 | 17.75 | 15.5 | 12.25 | 10.25 | 0 |
| | 65.0 | 19.25 | 18.0 | 15.5 | 13.25 | 11.0 |
| | 130 | 24.5 | 22.5 | 19.5 | 17.5 | 14.5 |
| | 0 | — | 34.0 | 30.75 | 27.25 | 22.25 |
| 209P | 16.3 | — | — | 33.5 | 30.25 | 25.0 |
| sensitive | 32.5 | — | — | 36.0 | 32.5 | 28.0 |
| strain | 65.0 | — | — | 36.0 | 32.5 | 28.0 |
| | 130 | — | — | — | 34.0 | 30.0 |

Recently, the cephalosporin analogues A16886A, A16886B and A16884 [R. Nagarajan, et al.: J. Amer. Chem. Soc. 93, 2308–2310 (1971); D. R. Brannon, et al.: Origin of glycine from acid hydrolysis of the β-lactam antibiotic A16886B. Antimicrob. Agents and Chemoth. 1, 242–246 (1972)] and cephamycins A, B and C [E. O. Stapley, et al.: Cephamycins: Production by Actinomycetes, biological characteristics and chemical characterization. Abstract, XIth Interscience Conference on Antimicrobial Agents and Chemotherapy, Atlantic City, N.J., 1971, p. 8; L. D. Cama, et al.: Substituted penicillin and cephalosporin derivatives. I. Stereospecific introduction of the C-6(7) methoxy group. J. Amer. Chem. Soc. 94, 1408–1410 (1972)] have been isolated from *Streptomyces* species. These materials were obtained by courtesy of respective discoverers and compared with MC696-SY2-A and -B substances of this invention. The results are shown in Table 7 below. The MC696-SY2-A and -B were stronger inhibitors of penicillinase than the cephalosporin analogues, but much weaker in inhibiting the growth of the bacteria.

Table 7.

Comparison of inhibitory activity against penicillinase and bacteria by MC696-SY2-A and -B with that of cephalosporin analogues

| | Inhibitory activity against penicillinase | | M.I.C. (mcg/ml)* | |
|---|---|---|---|---|
| Substance | Inhibition %/mcg (wt) by iodometric | MC696-SY2 units/mg by agar plate** | S. aureus FDA 209P | E. coli NIHJ |
| A16886A | 8/200 | 17.9 | 125 | 62.5 |
| A16886B | 50/220 | 13.3 | 500 | 8 |
| A16884 | 50/280 | 10.7 | 250 | 4 |
| Cephamycin A | 13.5/200 | 6.0 | 125 | 31.3 |
| Cephamycin B | 18/200 | 10.0 | 125 | 16 |
| Cephamycin C | 50/215 | 2.0 | >500 | 16 |
| MC696-SY2-A | 50/2.6 | 161 | 1,000 | 250 |
| MC696-SY2-B | 50/0.78 | 867 | 93.5 | 23.4 |

*Bouillon dilution method
**Units/mg means the value calculated as the potency of MC696-SY2

In the broth fermented with addition of cobalt salt to the medium according to the third aspect of the invention, high content of MC696-SY2 substance was produced and a highly active sample of MC696-SY2-A substance having a potency 60,400 units/mg was isolated by the procedure described in this invention. This sample is 60 times more active in inhibiting β-lactamase than the substance previously obtained and is several hundreds times purified than the MC696-SY2 substance of which properties were described earlier. Since the purification of the above purified sample (potency 60,400 units/mg) of MC696-SY2-A substance is not completed yet, its properties are not substantial. However, it is noteworthy to describe the properties of this sample below.

The sample of MC696-SY2-A substance (having a potency 60,400 units/mg) showed $ID_{50}$ (50% inhibition) against β-lactamase at a concentration of 0.0175 mcg as determined by the iodometric titration method. It showed minimum inhibitory concentration of the growth of various microorganisms (as determined by agar dilution method) as follows: 100 mcg/ml against *Bacillus subtilis, Bacillus anthracis* and *Proteus* species; and 200 mcg/mg against *Staphylococcus* species, *Micrococcus flavus, Micrococcus lysodeikticus, Klebsiella pneumoniae, Shigella* species and *Salmonella typhosa*. Penicillin-resistant microorganism was made sensitive against aminobenzylpenicillin, like the penicillin-sensitive strain, when the MC696-SY2-A was added to aminobenzylpenicillin (ampicillin) as shown in Table 8.

Table 8.

Effect of MC696-SY2-A substance to MIC (mcg/ml) of aminobenzylpenicillin against various microorganisms including resistant strain

| Test organisms | Aminobenzylpenicillin (potency 869 μg/mg) MC696-SY2-A substance* | | | |
|---|---|---|---|---|
| | 0 | 0.2 | 2 | 20 (mcg/ml) |
| E. coli K-12 W3630 | 1.56 | 1.56 | 0.78 | 0.39 |
| E. coli K-12 W3630 R75 | >100 | >100 | >100 | >100 |
| E. coli K-12 W3630 RGN238+ | >100 | >100 | 100 | 25 |
| E. freundii GN346 | >100 | >100 | >100 | >100 |
| Proteus rettgerii GN624 | 100** | 100** | 100** | 100 |
| Proteus morganii GN926 | >100 | 100 | 100 | 12.5 |
| Proteus vulgaris GN76 | >100 | 50 | 6.25 | 1.56 |
| Providence GN327 | 12.5 | 12.5 | 3.12 | 0.78 |
| Pseudomonas GN918 | >100 | >100 | >100 | >100 |
| Serratia GN633 | 100 | 100 | 100 | 50 |
| Klebsiella pneumoniae GN69 | >100 | >100 | >100 | 100–25** |
| Staphylococcus aureus S-642 | 0.1 | 0.1 | 0.05 | ±0.0125 |

*a sample of MC696-SY2-A substance (potency 60,400 units/mg) was used.
**partial inhibition Suitable proportion of MC696-SY2 substance which is added to the synthetic penicillin for the purpose of rendering it active against the microorganism resistant to said synthetic pencillin may be decided readily by carrying out some preliminary tests in which different dosages of MC696-SY2 substance in combination with a given dosage of the penicillin are reacted with a particular microorganism and the minimum inhibitory concentration of the penicillin against this microorganism is determined when the microorganism is subjected to the action of the penicillin used along with MC696-SY2 substance, as shown in the above table.

When the above-mentioned sample of MC696-SY2-A substance (potency 60,400 units/mg) was hydrolysed with 6N hydrochloric acid at 100°C for 16 hours in a sealed tube, 3.73 $\mu M$ )] to 1.26% per mol) ammonia, 4.06 $\mu M$ (6.10%) glycine, 4.41 $\mu M$ (16.0%) tyrosine, 1.56 $\mu M$ (4.14%) aspartic acid and 0.75 $\mu M$ (2.20%) glutamic acid were detected by amino acid analyzer. The ultraviolet absorption spectrum of this sample gave a maximum at 270 - 272 nm ($E_{1cm}^{1\%}$ 57.8), and the infrared absorption spectrum of this sample pelleted in potassium bromide is shown in FIG. 1. Elementary analysis of this sample gave C, 41.46%; H, 4.83%; N, 6.58%; O, 29.16%, S, 2.07% and ash, 27%. When the ash was calculated to be $Na_2O_2$, Na should be 15.9%. However, the content of sodium was 9.3% as measured by atomic absorption spectrophotometer.

The present invention is now illustrated with reference to Examples. However, Examples are merely illustrative and it should be understood that the present invention is not limited thereto.

EXAMPLE 1

*Streptomyces fulvoviridis* MC696-SY2 (identified as ATCC 21954), which is a strain producing the penicilinase-inhibitors, was inoculated to a culture medium (100 ml) consisting of 2% glycerol, 1.5% soybean meal, 0.1% $K_2HPO_4$, 0.1% $MgSO_4.7H_2O$, and 0.2% silicone oil (diluted with water to a 10-fold volume) at pH 7.0, sterilized at 120°C for 20 minutes. The inoculated medium was shake-cultured at 27°C for 4 days. The fermented broth was collected and freed from a solid part containing mycelia, by centrifugation at 0°–5°C. To the broth filtrate (2,000 ml) so obtained containing 280 units/ml of MC696-SY2 substance, 40 g of activated carbon was added at pH 6 in an ice bath and stirred for 20 minutes. The carbon was separated by centrifugation at 0°–5°C and washed with 300 ml of water. The MC696-SY 2 substance adsorbed on the carbon was eluted with 30% n-propanol (400 ml) at 40°–45°C for 10 minutes while maintaining at pH 8 with aqueous ammonia. The eluate was adjusted at pH 7 and concentrated to 1/10 volume at 40°C under reduced pressure. Yield was 52.5%. The concentrate was diluted to 250 ml with 0.005 M phosphate buffer (pH 7) and adsorbed on a column (2.7 cm × 60 cm) containing DEAE-cellulose (OH⁻ form) at 3°C. The column was washed with 0.01 M phosphate buffer (pH 7, 500 ml), and eluted with 0.01 M phosphate buffer (pH 7) with increasing the concentration of NaCl from 0 to 0.2 M NaCl in the buffer (1 liter each). When the eluted solution was collected in 15 ml fractions and the activities of penicillinase inhibition in the fractions were measured by the disc plate method, MC696-SY2-A substance from Fractions 61–79, -A' substance from Fractions 83–95 and MC696-SY2-B substance from Fractions 105 - 125 were obtained. Those A and B substances were always obtained, but A' substance was sometimes missed under certain fermentation conditions. Each active substance was adsorbed on active carbon, eluted with 30% n-propanol in water from the carbon cake which was thoroughly washed with water, concentrated below 40°C, suspended in methanol, precipitated by addition of ether and then dried under reduced pressure to give a powder. 55.8 mg (potency 187 units/mg) and 7.8 mg (potency 1,127 units/mg) of MC696-SY2-A substance, 29.0 mg (potency 84.7 units/mg) and 9.6 mg (potency 68.0 units/mg) of A' substance, and 41.4 mg (potency 592 units/mg) and 3.5 mg (potency 14.0 units/mg) of MC696-SY2-B substance were obtained. Yield during the gradient chromatography was 26.6%.

EXAMPLE 2

The broth filtrate (2,250 ml, 323 units/ml) obtained by the procedure as described in EXAMPLE 1 was adsorbed with active carbon at pH 5, eluted with 30% n-propanol and concentrated to 100 ml (31.2% yield). The concentrate was diluted with 0.01 M phosphate buffer (pH 7) to 400 ml, and fractionated by a column (3 × 75 cm) containing DEAE-cellulose as described in EXAMPLE 1. When the eluate was collected in 15 ml fractions, a weak activity appeared in Fractions 43–67, 69,300 units in 660 ml of MC696-SY2-A was obtained from Fractions 101–144 and 29,900 units in 645 ml of MC696-SY2-B was obtained from Fractions 145–187. After the combined fractions were treated with carbon as described in Example 1, two concentrates containing A or B substance were separately poured into two similar column containing dextran cross-linked with epichlorohydrin (Sephadex G-25) (fine), developed with distilled water, collected in 10 ml fractions and lyophilized, yielding white to light brown powder as follows; MC696-SY2-A: 64.7 mg, (potency 161 units/mg) in Fr. 9; 43.3 mg, (potency 154 units/mg) in Fr. 10; 21.0 mg, (potency 113 units/mg). MC696-SY2-B: 16.9 mg, (potency 107 units/mg) in Fr. 10; 8.1 mg, (potency 867 units/mg) in Fr. 11; 4.2 mg, (potency 307 units/mg) in Fr. 12. Allover yield was 4.58%. All procedures mentioned above are performed in a cold room (ca. at 3°C). The powder (161 units/mg) of MC696-SY2-A substance obtained from Fr. 9 gives $ID_{50}^- = 2.6$ mcg as determined by the iodometric titration method and inhibits *Staphylococcus aureus* 209P at 1,000 mcg/ml and *Escherichia coli* NIHJ at 250 mg/ml. The MC696-SY2-B substance (potency 867 units/mg) obtained from Fr. 11 gives $ID_{50} = 0.76$ mcg and inhibits *S. aureus* 209P and *E. coli* NIHJ at 93.7 and 23.4 mcg/ml, respectively.

EXAMPLE 3

By the procedure as described in EXAMPLE 1, 2, 250 ml of broth filtrate (135 units/mg) gave 550 ml of the eluate from active carbon (yield 65.4%), and the concentrated (at 4°C) eluate (198 ml, 695 units/ml) was poured into and adsorbed on a column (3 × 39 cm) containing DEAE-cellulose (Cl⁻ form) pre-treated with 0.01 M phosphate buffer (pH 7.0). When the column was eluted by gradient chromatographic procedure as described in Example 1 and the eluate was collected in 17 ml fractions, a weak activity was eluted in Fr. 21–31 (165 ml, 6.7 units/ml), MC696-SY2-A substance (525 ml, 125 units/ml) in Fr. 71–101 and MC696-SY2-B substance (335 ml, 90.7 units/ml) in FR. 115–134. Yield was 32%. Those fractions were lyophilized and desalted with aid of an absorbent Amberlite XAD-2 for purification. The MC696-SY2-A substance in 14.8 ml of water was poured into a column (1.5 cm × 26 cm) containing Amberlite XAD-2, and the column was developed with distilled water. When the eluate was collected in 10 ml fractions, Fr. 8–20 containing activity was lyophilized but Fr. 6–7 containing activity with salts was rechromatographed with a similar column. Then, 73.3 mg, 144 units/mg of MC696-SY2-A substance was obtained. In similar fashion, 15 ml of MC696-SY2-B substance was treated with a column (2 × 14 cm), and Fr. 8–11 was lyophilized and Fr. 6–7 was rechromatographed. The MC696-SY2-B substance (19.2 mg, potency 345 units/mg) was obtained. Allover the yield was 5.7%.

EXAMPLE 4

One loopful organism was taken from a slant culture of the strain MC696-SY2 (FERM-P No. 1504; ATCC 21954) and inoculated into 500 ml of shaking flask containing 80 ml of a culture medium comprising 2% glycerol. 1.5% corn steep liquor, 0.1% $K_2HPO_4$ and 0.05% $MgSO_4 \cdot 7H_2O$ at pH 6.8 which had been sterilized at 120°C for 20 minutes. This inoculated medium was shake-cultured at 28°C for 24 hours on a reciprocal shaking machine. One mililiter of the cultured broth was inoculated into 250 ml of Erlenmyecr flask containing 30 ml of a sterilized culture medium (pH 6.8) consisting of 2% glycerol and 1.5% soybean meal and trace amounts of various metal salts added. This was shake-cultured on a rotary shaking machine for 2 days, and the inhibitory activity of the broth against penicillinase was measured by the agar plate method. The results were shown in Table 9 below. The results showed that addition of 0.1% of $K_2HPO_4$ and 0.0005% cobalt chloride increased production of the inhibitory substance. The effect of addition of various amounts of cobalt chloride and potassium phosphate was also examined in the same manner and the results obtained are shown in Tables 9 and 10 below.

Table 9.

Effect of trace metal salts 42 production of inhibitory substance

| $K_2HPO_4$ | $MgSO_4 \cdot 7H_2O$ | $CoCl_2 \cdot 6H_2O$ | $ZnSO_4 \cdot 7H_2O$ | $FeSO_4 \cdot 7H_2O$ | $MnSO_4 \cdot 4H_2O$ | $Na_2MoO_4 \cdot 2H_2O$ | $CuSO_4 \cdot 5H_2O$ | Inhibitory activity of the broth units/ml |
|---|---|---|---|---|---|---|---|---|
| 0.1 % | 0.1% | 0% | 0% | 0% | 0% | 0% | 0% | 0 |
| 0.1 | 0.1 | 0 | 0 | 0.0005 | 0.001 | 0.0005 | 0.0005 | 0 |
| 0.1 | 0.1 | 0.0005 | 0.0005 | 0 | 0 | 0.0005 | 0.0005 | 2,500 |
| 0.1 | 0.1 | 0.0005 | 0.0005 | 0.0005 | 0.001 | 0 | 0 | 2,900 |
| 0.1 | 0 | 0 | 0.0005 | 0 | 0.001 | 0 | 0.0005 | 3,530 |
| 0.1 | 0 | 0 | 0.0005 | 0.0005 | 0 | 0.0005 | 0 | 600 |
| 0.1 | 0 | 0.0005 | 0 | 0 | 0.001 | 0.0005 | 0 | 6,300 |
| 0.1 | 0 | 0.0005 | 0 | 0.0005 | 0 | 0 | 0.0005 | 5,930 |
| 0 | 0.1 | 0 | 0 | 0 | 0 | 0 | 0.0005 | 3,300 |
| 0 | 0.1 | 0 | 0 | 0.0005 | 0.001 | 0.0005 | 0 | 0 |
| 0 | 0.1 | 0.0005 | 0.0005 | 0 | 0 | 0.0005 | 0 | 0 |
| 0 | 0.1 | 0.0005 | 0.0005 | 0.0005 | 0.0001 | 0 | 0.0005 | 0 |
| 0 | 0 | 0 | 0.0005 | 0 | 0.0001 | 0 | 0 | 900 |
| 0 | 0 | 0 | 0.0005 | 0.0005 | 0 | 0.0005 | 0.0005 | 0 |
| 0 | 0 | 0.0005 | 0 | 0 | 0.0001 | 0.0005 | 0.0005 | 2,167 |
| 0 | 0 | 0.0005 | 0 | 0.0005 | 0 | 0 | 0 | 1,630 |

Table 10.

Effects of cobalt chloride and potassium phosphate on the production

| $CoCl_2 \cdot 6H_2O$ | Potassium phosphate | | Activity of the broth (units/ml) |
|---|---|---|---|
| 0.001% | $K_2HPO_4$ | 0.05% | 11,200 |
| " | $K_2HPO_4$ | 0.1 | 5,930 |
| " | $KH_2PO_4$ | 0.1 | 6,867 |
| 0.0005% | $K_2HPO_4$ | 0.05 | 8,400 |
| " | $K_2HPO_4$ | 0.1 | 6,867 |
| " | $KH_2PO_4$ | 0.1 | 16,330 |
| 0.00025% | $K_2HPO_4$ | 0.05 | 9,130 |
| " | $K_2HPO_4$ | 0.1 | 12,930 |
| " | $KH_2PO_4$ | 0.1 | 16,330 |

EXAMPLE 5

Medium No. 1 comprising 1.5% soybean meal, 2% glycerol, 0.1% $K_2HPO_4$ and 0.05% $MgSO_4 \cdot 7H_2O$ was sterilized at pH 6.5, and medium No. 2 comprising 0.0005% $CoCl_2.6H_2O$ instead of the magnesium sulfate in the medium No. 1 was prepared and sterilized at pH 6.2. Shaking cultures of the strain MC696-SY2 (ATCC 21954) inoculated to the above two media was made in the same way as in Example 4. The results are shown in Table 11. Fifteen liters of each of the inoculated above media was cultured in a 30 liters jar fermentor with 250 rpm stirring and at aeration rate of 15 l/min. The results are shown in Table 12.

Table 11.

Effect of cobalt compounds in shaking culture

| Exp. No. | Me-dium | 2 days pH | Activity of broth units/ml | 3 days pH | units/ml |
|---|---|---|---|---|---|
| 1 | (1) | 6.0 | 433 | 5.8–6.0 | 267 |
|   | (2) | 5.8 | 2,667 | 5.8 | 733 |
| 2 | (1) | 5.8 | 667 | 5.8 | 466 |
|   | (2) | 6.0 | 3,733 | 6.0 | 11,333 |

Table 12.

Effect of cobalt compounds in jar fermentor

| Medium | 24 hrs pH | Activity of broth units/ml | 45–47 hrs pH | units/ml |
|---|---|---|---|---|
| (1) | 6.6 | 100 | 6.7 | 267 |
| (2) | 6.2 | 867 | 6.1 | 28,000 |
| (2) | 6.3 | 1,533 | 5.9 | 12,000 |

EXAMPLE 6

In the EXAMPLE 5, 47 hours culture of the medium No. 2 incubated in the jar fermentor showed pH 6.8 and produced 28,000 units/ml of MC696-SY2 substance. The culture filtrate containing 204.7 × 10⁶ units of MC696-SY2 substance was adjusted to pH 6 and adsorbed with 140 g of activated carbon under stirring and cooling. The carbon was separated by cold centrifugation and washed with cold water (900 ml). A half portion of the carbon was stirred with 1,200 ml of 50% aqueous acetone for 10 minutes at 40°–45°C and at pH 8 maintained with aqueous ammonia. After removing the carbon by filtration, 1,090 ml of eluate containing 71.373 × 10³ units of MC696-SY2 was obtained. The eluate was adjusted to pH 7 and concentrated to 170 ml at below 40°C under reduced pressure. The concentrate was diluted to 500 ml with 0.005 M phosphate buffer (pH 7) and adsorbed on DEAE-cellulose (OH⁻ form) column (4.3 × 73 cm) at a cold room (5°C). After washing the column with 2 l of 0.01 M phosphate buffer (pH 7), gradient elution was made using 2 l of 0.01 M phosphate buffer (pH 7) and 2 l of the same buffer but containing 0.2 M NaCl. The eluate was collected in 17 ml fractions and measured for their inhibitory activity against penicillinase. As the result, 8,870 units of activity was found in Fr. 15–49 and 10,500 units in Fr. 77–105. The 19.4 × 10⁶ units of MC696-SY2-A substance was obtained from Fr. 151–251, and 693×10³ units of MC696-SY2-B substance from Fr. 271–350. Then, 2.01 × 10⁶ units (71.8%) was eluted in total.

The MC696-SY2-A substance in Fr. 151–250 were combined and applied to a column containing 2% (W/V) of carbon, and the column was washed with water. The carbon was eluted at pH 8 with 50% aqueous acetone, once with 20 times volume of 50% aqueous acetone as much as the volume of the carbon and twice with 10 times volume of 50% aqueous acetone as much as the volume of the carbon. The eluates were combined and concentrated under reduced pressure below 40°C to 10 ml containing 18.933 × 10⁶ units. The concentrate was applied to a column of Sephadex G-10 (fine) and developed with distilled water. The eluate was fractionated in 10 ml. Active fractions were lyophilized and obtained as follows.

Fr. 12: 94.5 mg (1,840 units/mg), total 173 × 10³ units Fr. 13: 54.7 mg (28,400 units/mg), total 1553 × 10³ units Fr. 14: 60.8 mg (60,400 units/mg). total 3667 × 10³ units Fr. 15: 54.8 mg (43,400 units/mg), total 2380 × 10³ units Fr. 16: 12.6 mg (14,800 units/mg), total 187 × 10³ units Fr. 17: 5.1 mg (1,690 units/mg), total 8.7 × 10³ units
As a whole, 7,969 × 10³ units (41.1% yield) was obtained. The above procedures were carried on in a cold as possible room (about 3°C). The most active powder obtained from Fr. 14 showed $ID_{50}$ = 0.0175 mcg as determined by the iodometric titration method and inhibited *Staphylococcus aureus* FDA 209P at a concentration of 133 mcg/ml and *Escherichia coli* NIHJ strain at a concentration of 50 mcg/ml as determined by the dilution method.

EXAMPLE 7

The MC696-SY2-A substance was tested for the in vivo effect antagonistic to a β-lactamase which was produced by penicillin-resistant staphylococci. *Staphylococcus aureus* 193, a resistant strain to penicillin, tetracyclines and streptomycin, was activated in 5% heart infusion broth at 37°C for 18 hours, and the cultured broth was five-fold diluted with sterile mucin suspension and the diluted broth was intraperitoneally inoculated into mice in a dose of 0.5 ml per mouse. One and a half hours after the infection, the mice were intraperitoneally treated with mixtures of substance MC696-SY2-A, and penicillin G or with penicillin G alone. The results were described at 48 hours after the injection. An example of the results is shown in Table 13:

Table 13

| Penicillin G units/mouse | No. of the survivor/No. of the treated MC696-SY2-A substance 10,000 units/mouse | 0 units/mouse |
|---|---|---|
| 0 | 0/8 | 0/16 |
| 20 | 3/8 | 0/8 |
| 78 | 3/8 | 0/8 |
| 313 | 3/8 | 0/8 |
| 1,250 | 7/8 | 0/8 |
| 5,000 | 6/8 | 0/8 |

The preceding example can be repeated with similar success by substituting the generically or specifically described culture media and/or incubation conditions and/or procedures of recovering the β-lactamase inhibitors according to the present invention, for those used in the above-mentioned example.

From the foregoing description, one skilled in the art can easily ascertain the essential characteristics of the present invention, and without departing from the spirit and scope thereof, can make various changes and modifications of the invention to adapt it to various usage conditions.

What we claim is:

1. Bacteriostatis MC696-SY2-A substance obtainable by the aerobic cultivation of *Streptomyces fulvoviridis* ATCC 21,954, said substance being heat labile and of an acidic nature; inhibiting β-lactamase activity; being soluble in water but substantially insoluble in butanol, ethyl acetate, ethyl ether, chloroform and benzene; being hydrolyzable by heating with concentrated HCl in a sealed tube for 16 hours at about 100°C. to $NH_3$, aspartic acid, glutamic acid, glycine and tyrosine; and being resistant to penicillinase at 37° C. for 3 hours under conditions which completely hydrolyze benzylpencillin; said MC696-SY2-A substance being further characterized by
   a. having an infrared absorption spectrum pelleted in potassium bromide corresponding to that shown in FIG. 1 of the attached drawings;
   b. the elemental analysis of an impure sample having a potency of 60,400 units/mg. being C 41.46%; H 4.83%; N 6.58%; O 29.16%; S 2.07%; and sodium-containing ash 27%;
   c. having an ultraviolet absorption spectrum characterized by $\lambda_{max}$ at about 270–272 nm ($E_1\ _{cm}^{1\%}$ 115); and
   d. giving a $R_f$ value in thin layer chromatography on silica gel $GF_{254}$ on 5 × 20 cm. glass plates of about 0.32–0.37 with n-propanol-0.1 M (pH 7) phosphate buffer (7:3) as the developing solvent.

2. Bacteriostatic MC696-SY2-B substance obtainable by the aerobic cultivation of *Streptomyces fulvoviridis* ATCC 21,954, said substance being heat labile and of an acidic nature; inhibiting β-lactamase activity; being soluble in water but substantially insoluble in butanol, ethyl acetate, ethyl ether, chloroform and benzene; being hydrolyzable by heating with concentrated HCl in a sealed tube for 16 hours at about 100° C. to $NH_3$, aspartic acid, glutamic acid and glycine; and being resistant to penicillinase at 37° C. for 3 hours under conditions which completely hydrolyze benzylpencillin; said MC696-SY2-B substance being further characterized by
   a. having an infrared absorption spectrum pelleted in potassium bromide corresponding to that shown in FIG. 2 of the attached drawing;
   b. the elemental analysis of an impure sample having a potency of 6,670 units/mg. being C 38.29%; H 5.22%; N 3.96%; O 37.50%; S 1.12% and 180 mcg/mg. sodium-containing ash;
   c. having an ultraviolet spectrum characterized by $\lambda_{max}$ at about 288 nm ($E_1\ _{cm}^{1\%}$ 115); and
   d. giving an $R_f$ value in thin layer chromatography on silica gel $GF_{254}$ on 5 × 20 cm. glass plates of about 0.410–.46 with propanol-0.1 M (pH 7) phosphate buffer (7:3) as the developing solvent.

3. A process for the preparation of MC-696-SY2 substance which comprises cultivating *Streptomyces fulvoviridis* ATCC 21,954 under aerobic growth conditions in a suitable culture medium therefor containing assimilable carbon and nitrogen sources for a period of time to produce and accummulate said MC-696-SY2 substance in the culture medium.

4. A process according to claim 3 wherein the culture medium additionally includes water-soluble cobalt salt to increase production of said MC-696-SY2 substance.

5. A process according to claim 3, further comprising recovering said MC-696-SY2 substance from the culture medium.

6. MC-696-SY2 substance obtained according to the process of claim 5.

* * * * *